UNITED STATES PATENT OFFICE.

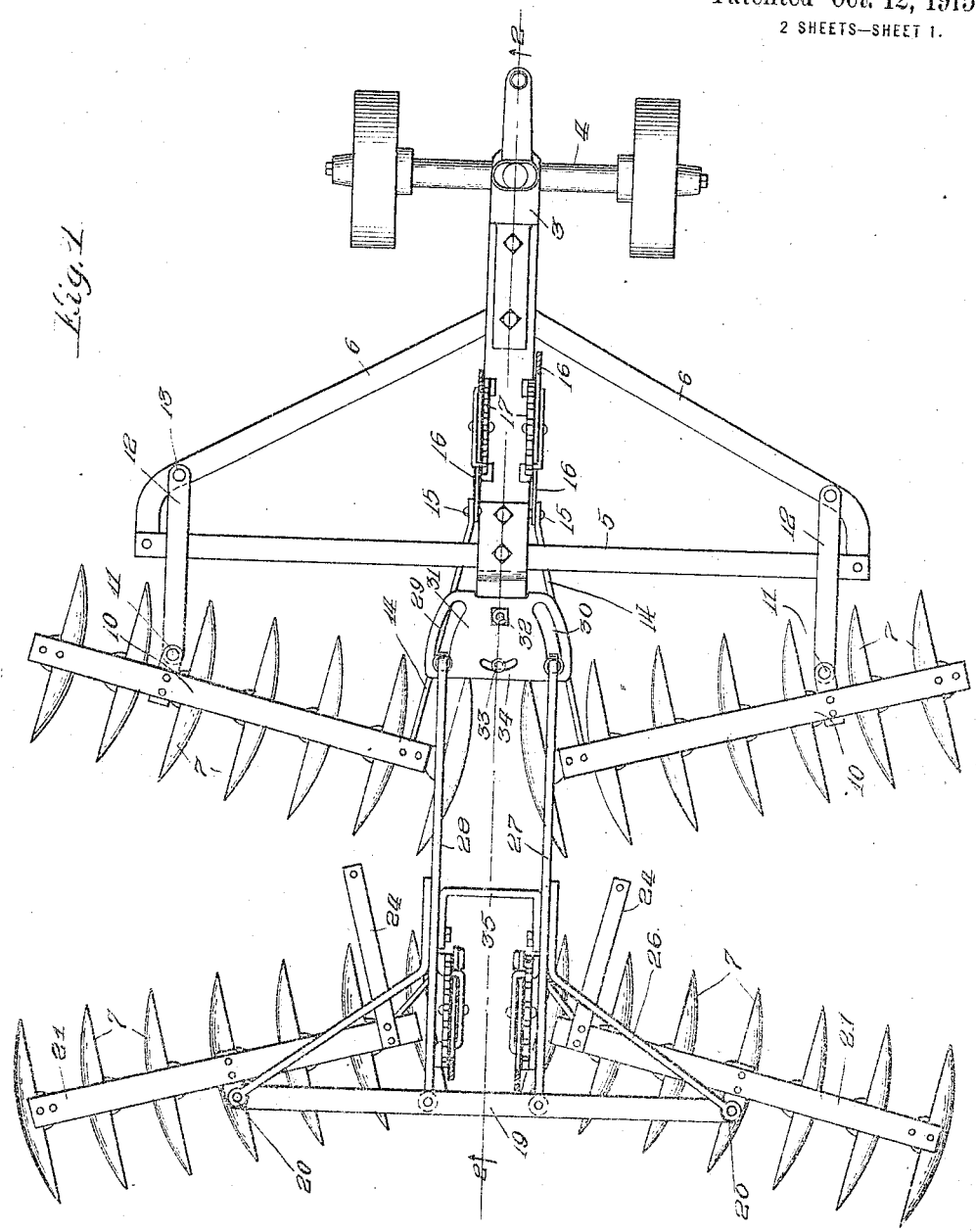

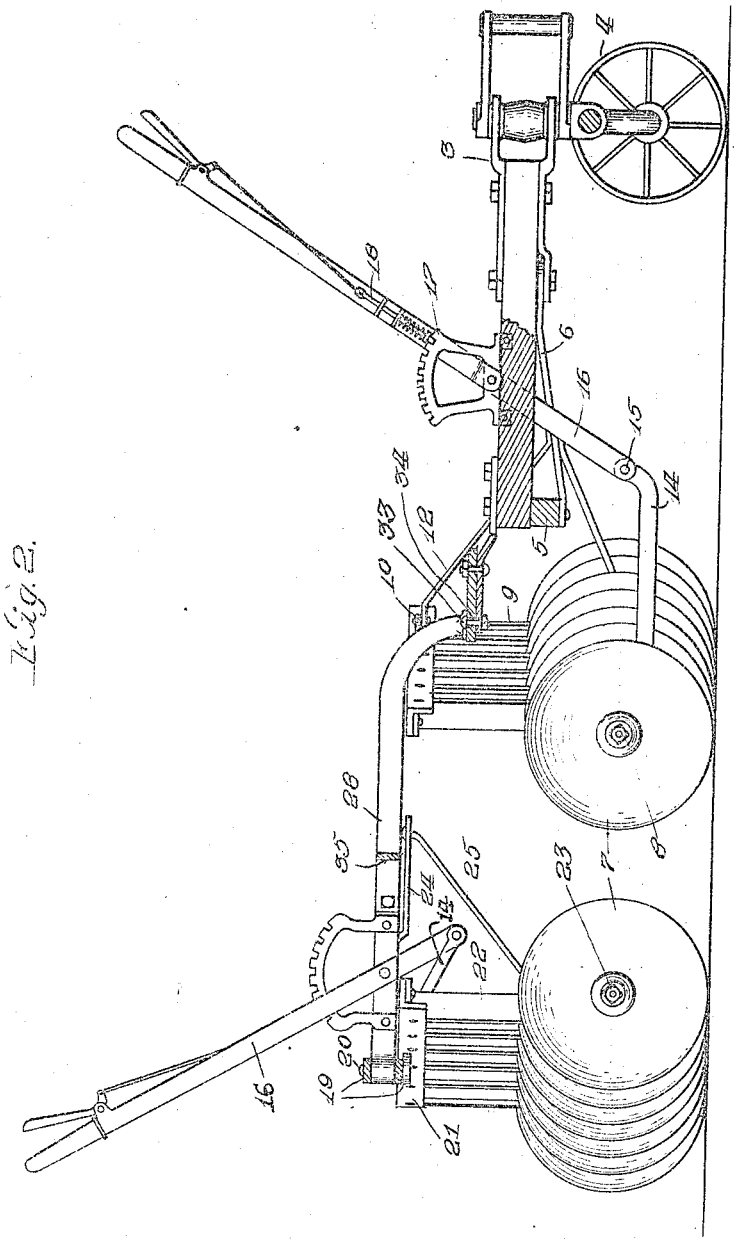

CLEMENT W. MICHAEL, OF RACINE, WISCONSIN, ASSIGNOR TO J. I. CASE PLOW WORKS, OF RACINE, WISCONSIN, A CORPORATION OF WISCONSIN.

HARROW.

1,156,611.      Specification of Letters Patent.      Patented Oct. 12, 1915.

Application filed August 10, 1914. Serial No. 856,032.

*To all whom it may concern:*

Be it known that I, CLEMENT W. MICHAEL, a citizen of the United States, residing at Racine, in the county of Racine and State of Wisconsin, have invented certain new and useful Improvements in Harrows, of which the following is a specification.

My invention relates more particularly to the so-called tandem disk harrows which consist ordinarily of two distinct members each carrying a pair of transversely arranged disk shafts, the members being connected together so that one of them follows the other. The disk shafts of each harrow section are pivoted thereto upon opposite sides thereof and suitable means is provided whereby the shafts may be adjusted about their pivots so as to vary the angle of inclination thereof to the direction of movement of the harrow section. In use the shafts of the forward section are adjusted to incline rearwardly toward the center so that the action of the disks tends to move the soil outward from the center of the harrow, while the shafts of the rear section converge forwardly and tend to move the soil toward the center. It is common in devices of this character to pivot the rear harrow section to the front harrow section by a reach which is rigidly attached to the former and extends forwardly and is centrally pivoted to the latter which has the effect of permitting the rear section to follow the forward section and also facilitates turning the device in a manner which will be readily apparent. It has been found, however, that with the rear section pivoted to the front section as above described at a single central point, the rear section is too readily thrown from its proper position with relation to the forward section when the harrow is being used in connection with rocky, lumpy or irregular soil. It has also been proposed to form the two sections into a rigid whole or, what amounts to the same thing, to mount all the disk shafts upon a single rigid frame. This construction, however, has the disadvantage that in turning a corner, as for example at the end of a field being worked, the disks are scraped sidewise and in this way scoop up and displace the top soil. My invention has in view so connecting the sections that they may readily turn with relation to each other when the machine as a whole is to be turned about in a field, but when the machine is being drawn directly forward as it is intermediate the ends of a field being worked, the rear harrow will accurately maintain its central position directly behind the front harrow notwithstanding any roughness or unevenness ordinarily found in agricultural land.

In the accompanying drawing I have shown and in the following specification specifically described a preferred form of my invention; it is to be understood, however, that the specific disclosure is for the purpose of exemplification only and that my invention is not limited thereto but is defined in the following claims in which I have endeavored to distinguish it from the prior art without, however, relinquishing or abandoning any feature or portion thereof.

Referring now to the drawing, Figure 1 represents my improved harrow in plan, and Fig. 2 in longitudinal vertical section mainly through the center of the machine.

The specific character of the front and rear sections is immaterial. The front section as shown comprises the tongue 3, for attachment of the horses or other motive power, which is mainly supported by a truck 4 of ordinary character and at its rear end is provided with a transverse member 5 connected at its ends to said tongue by diagonal braces 6, 6. The disks 7 of the front harrow section are mounted upon shafts 8 which are supported in hangers 9 depending from frame bars 10, and the latter are pivoted at 11 to the rear ends of links 12 which are attached at 13 to the front section frame. The inner ends of the disk shafts are suitably connected to the rear ends of rods 14 which at their forward ends are pivoted as at 15 to adjusting levers 16 by which the disk frames may be swung about their pivots to adjust their angular relation to the front section and a rack bar 17 is provided for each such lever to maintain the latter in adjusted position by engagement with the spring pressed pin 18 thereon. No novelty is claimed for the harrow section as above described. The rear harrow section is also in the main of well known construction, consisting of a transverse bar 19 to which the disk carrying frames are pivoted at 20, 20. As in the forward harrow sections so here the disk frames comprise angle irons 21 by which said frames are pivoted to the transverse bar 19 and which carry hangers 22 in which the disk shafts 23 are journaled. Means similar to those on the front section control the adjustment of the disk frames. The frames also carry forwardly projecting arms 24 which are connected at their outer ends with the disk shaft by braces 25 and extend beneath and are supported against the inclined braces 26 by which the transverse rod 19 is connected at its ends to the reaches 27, 28. The transverse bar, disk shafts and disks and their connections as above described are old in the art. The pair of reaches 27, 28, however, form a feature of my invention and are rigidly attached to the rear harrow section and at their forward ends they are downwardly turned to enter slots 29, 30 formed in a plate 31 which is rigidly attached to the rear end of the tongue 3. The slots 29, 30 are not concentric but the arc of each is struck from the rear end of the other as a center, for a purpose which will presently appear, and the plate 31 while normally rigid with respect to the tongue is adjustable about the bolt 32 by which it is connected to the tongue, a bolt 33 extending through a curved slot 34 serving to lock the plate in adjusted position. A cross brace 35 strengthens and spaces apart the twin reaches 27 and 28.

It will now be apparent that as long as the harrow is being drawn directly forward the forward ends of the reaches 27, 28 will remain in the rear ends of the slots 30, 29, respectively and the draft of the rear harrow section be distributed between the two reaches; and by reason of the character of the connection described and shown the rear harrow will absolutely maintain its correct position with reference to the front harrow. If for any reason the harrows do not properly track a slight adjustment of the plate 31 by means of the bolt 33 will serve to correct any deviation. When it is desired to turn the harrow to the right or left as the case may be, as for example at the end of the field when it is desired to return, the turning of the front harrow section is accomplished with the pin or reach end on the opposite or outer side as a pivot, the reach end on the inside merely running forward in its slot in the plate. When the turning movement is completed and the harrow again drawn forward the double or twin reaches again divide the draft of the rear harrow section and serve to maintain it in its correct alinement behind the front harrow.

I claim:

1. In a double harrow, a front and rear frame, means upon the respective frames for forming a double connection between the same, one of said means being angularly adjustable in a horizontal plane to vary the normal angular relation of the frames to each other.

2. In a device of the class described, a front frame and a rear frame, a pair of pin and slot connections between said frames comprising an angularly adjustable plate whereby the normal angular relation of the frames may be varied.

3. In a double harrow, a front frame and a rear frame, means upon the front frame carrying a pair of slots, means upon the rear frame carrying pins engaging and movable within the respective slots, one of said means being adjustable to vary the normal angular relation of said frames.

4. In a device of the class described, a front harrow section having a plate pivoted upon the rear end of it, means for adjusting said plate about its pivot and for maintaining it in adjusted position, a rear harrow section and a pair of reaches extending from said rear harrow section and engaging said plate.

CLEMENT W. MICHAEL.

Witnesses:
HARRY L. SMITH,
LINDA FELGENHAUER.